(12) United States Patent
Chen

(10) Patent No.: US 12,422,740 B2
(45) Date of Patent: Sep. 23, 2025

(54) PROJECTOR WITH THERMAL SUPERCONDUCTING MATERIAL FOR HEAT DISSIPATION

(71) Applicant: Changsha Pujiade Photoelectric Technology Co., Ltd, Changsha (CN)

(72) Inventor: Ling Chen, Changsha (CN)

(73) Assignee: Changsha Pujiade Photoelectric Technology Co., Ltd, Changsha (CN)

( * ) Notice: Subject to any disclaimer, the term of this patent is extended or adjusted under 35 U.S.C. 154(b) by 449 days.

(21) Appl. No.: 18/056,698

(22) Filed: Nov. 17, 2022

(65) Prior Publication Data

US 2024/0085769 A1    Mar. 14, 2024

(30) Foreign Application Priority Data

Sep. 11, 2022 (CN) .......................... 202211106386.5

(51) Int. Cl.
*G03B 21/16* (2006.01)
*G03B 21/00* (2006.01)

(52) U.S. Cl.
CPC ........... *G03B 21/16* (2013.01); *G03B 21/006* (2013.01)

(58) Field of Classification Search
CPC .. G03B 21/16; G03B 21/006; G03B 21/2033; H04N 9/3144

USPC .......................................................... 353/58
See application file for complete search history.

(56) References Cited

FOREIGN PATENT DOCUMENTS

| CN | 105140149 A | 12/2015 | | |
|----|-------------|---------|---|---|
| CN | 211630690 U | 10/2020 | | |
| CN | 212276202 U | * 1/2021 | ............. | G03B 21/16 |
| CN | 113156754 A | 7/2021 | | |
| CN | 214586365 U | * 11/2021 | ............. | G03B 21/20 |
| CN | 114047664 A | 2/2022 | | |
| CN | 216351743 U | * 4/2022 | ............. | G03B 21/16 |
| CN | 217386118 U | * 9/2022 | ............. | G03B 21/16 |

* cited by examiner

*Primary Examiner* — Magda Cruz

(57) ABSTRACT

A projector with a thermal superconducting material for heat dissipation is disclosed. The projector includes a projector housing, and an optical machine shell, a thermal superconducting material heat dissipation apparatus, an outer fan, an inner circulation fan, a projection light source and an LCD light valve. The thermal superconducting material heat dissipation apparatus includes a light source radiator and an optical machine heat exchanger. The outer fan performs air draft for the light source radiator. An inner circulation air duct is arranged inside the optical machine shell. The inner circulation fan, the LCD light valve and a heat absorption fin set are arranged in the inner circulation air duct. A heat dissipation ventilation duct is defined between an inner wall of the projector housing and an outer wall of the optical machine shell.

5 Claims, 10 Drawing Sheets

PROJECTOR WITH THERMAL SUPERCONDUCTING MATERIAL FOR HEAT DISSIPATION

CROSS REFERENCE TO RELATED APPLICATIONS

This application claims foreign priority of Chinese Patent Application No. 202211106386.5, filed on Sep. 11, 2022 in the China National Intellectual Property Administration, the disclosures of all of which are hereby incorporated by reference.

TECHNICAL FIELD

The present invention relates to the technical field of projectors, and particularly relates to a projector with a thermal superconducting material for heat dissipation.

BACKGROUND OF THE PRESENT INVENTION

It is known that a phase change inhibited (abbreviated as PCI) heat transfer technology is an emerging technology that realizes high-efficient heat transfer by controlling a state of a micro-structure "phase" of a heat transfer working medium in a closed cavity (or a heat transfer passage, a heat flow passage, etc.), and has the characteristics of ultrahigh heat transfer rate, capability of transferring ultrahigh heat flow density, and ultrahigh in-plane temperature uniformity. Therefore, the PCI heat transfer technology is widely applied to the fields of high-efficient heat dissipation (including, but not limited to heat transfer, heat diffusion, etc.) for heating sources with high energy densities. A general shape of a PCI (plate) device is shown in FIG. 12. In FIG. 12, 11' indicates a filling seal of the heat transfer working medium; 12' indicates the heat transfer passage; 13' indicates a metal substrate; and generally the metal substrate 13' is formed by laminating an upper substrate and a lower substrate. A production process of the PCI is relatively mature, and has prominent performance advantage in the field of heat transfer materials. It may refer to Chinese patent publication numbers CN211630690U and CN105140149 for mechanisms (although not completely known by the human beings), applications and structures of the PCI. Compared with a heat tube, a heat conductivity coefficient of the PCI is lower than that of the heat tube (about one third of the heat tube according to the disclosed data) in terms of one-way heat transfer, but the PCI can transfer the heat in a two-dimensional plane or in an arbitrary three-dimensional direction. Therefore, the overall heat transfer speed and bearable heat flow density of the PCI are much better than that of the heat tube. If people uses flame of 1300° C. to locally heat a single point of the PCI (the substrate is made of aluminum), the ultrahigh energy density and the ultrahigh flame temperature can also be diffused rapidly by PCI without being burned. Apparently, the ordinary heat tube and other existing phase change heat transfer materials are difficult to have the special performance. Therefore, PCI is also known as "thermal superconducting material" in the industry.

For the current domestic LCD projectors, high-power LED light sources are generally used to structurally seal an optical system (commonly known as sealed optical machine or optical machine, the same below). In the prior art, a popular trend is to use a heat-tube heat exchanger for exchanging the heat of air inside the sealed optical machine; referring to a heat-tube heat exchanger of a sealed optical machine shown in FIG. 15 and FIG. 16, the heat tube 14' may cause large wind resistance (windshield and turbulent flow); and for a distance from an end (such as a point a') of a fin 15' (generally buckled FIN) to the heat tube 14', the heat resistance is very large because the fin is thin, thereby remarkably reducing the heat exchange efficiency. Similarly, the heat-tube radiator used by the LED light source also has the above problems. The characteristics of the PCI such as ultrahigh heat transfer speed and high in-plane temperature uniformity well overcome the disadvantages of the heat-tube technology through reasonable design and production; and compared with the existing mature technologies such as a straight-rib heat exchanger (as shown in FIG. 17), the PCI also has remarkable performance advantages.

The heat dissipation of the existing projection light source (such as LED or laser) and the sealed optical machine is basically realized by heat transfer through the heat tube and heat diffusion through the fins connected to the heat tube. These technologies lag far behind the expectation of the market development for the products. Therefore, the purpose of the present invention is to find a more convenient and effective heat dissipation way for the optical machine and the projection light source through exploration and innovation.

SUMMARY OF PRESENT INVENTION

A purpose of the present invention is to overcome the disadvantages of the prior art, and to provide a projector with a thermal superconducting material for heat dissipation; the heat dissipation capacity of a light source radiator and an optical machine heat exchanger in the present invention is much better than that of the existing heat dissipation structures; moreover, the problems of the existing heat dissipation structures such as heat resistance, wind resistance, turbulent flow and the like are remarkably or fundamentally improved; and the present invention is high in heat dissipation capacity and high in heat dissipation efficiency.

To realize the above purpose, the present invention provides a projector with a thermal superconducting material for heat dissipation, which includes a projector housing, and an optical machine shell, a thermal superconducting material heat dissipation apparatus, an outer fan, an inner circulation fan, a projection light source and an LCD light valve, which are located in the projector housing; and a front surface of the projection light source is installed at a light source installation port on one end of the optical machine shell.

The thermal superconducting material heat dissipation apparatus includes a light source radiator and an optical machine heat exchanger.

The light source radiator includes a first PCI plate, a first fin set and a second fin set; the first PCI plate is bent to form a U-shaped structure; an inner wall of one end of the U-shaped structure of the first PCI plate is laminated with the first fin set; an inner wall of the other end of the U-shaped structure of the first PCI plate is laminated with the second fin set; and a back surface of the projection light source is laminated with the middle of the U-shaped structure of the first PCI plate.

Or the light source radiator includes a first fin set, a second fin set, a third PCI plate, a fourth PCI plate, a fifth PCI plate, a first switching block and a second switching block; the first switching block and the second switching block are made of metal; at least two adjacent surfaces of each of the first switching block and the second switching block are planes; the back surface of the projection light source is laminated to the middle of the fourth PCI plate, and the fourth PCI plate is horizontally installed in the projector housing; the third PCI plate and the fifth PCI plate are vertically installed in the projector housing; two ends of the fourth PCI plate are connected with the planes of the first switching block and the second switching block respectively; a lower end of the third PCI plate is connected with the plane of the first switching block; a lower end of the fifth PCI plate is connected with the plane of the second switching block; and the third PCI plate is laminated with the first fin set, and the fifth PCI plate is laminated with the second fin set.

The outer fan is opposite to the light source radiator in positions; and the outer fan performs air draft for the light source radiator.

The optical machine heat exchanger includes a first heat release fin set, a second heat release fin set, a heat absorption fin set, a sixth PCI plate and a seventh PCI plate; the sixth PCI plate and the seventh PCI plate are arranged in parallel; and the first heat release fin set, the heat absorption fin set and the second heat release fin set are successively arranged in parallel, and clamped between the sixth PCI plate and the seventh PCI plate, and laminated with two opposite inner walls of the sixth PCI plate and the seventh PCI plate.

An inner circulation air duct is arranged inside the optical machine shell; the inner circulation fan, the LCD light valve and the heat absorption fin set are arranged in the inner circulation air duct; heat generated by the LCD light valve is sent by the blowing of the inner circulation fan to the heat absorption fin set through the inner circulation air duct; and the air cooled by the heat absorption fin set is sent back to an air inlet of the inner circulation fan through the inner circulation air duct.

A heat dissipation ventilation duct is defined between an inner wall of the projector housing and an outer wall of the optical machine shell; the first fin set, the second fin set, the first heat release fin set and the second heat release fin set are located in the heat dissipation ventilation duct; two ends of the heat dissipation ventilation duct are respectively aligned to vent holes arranged at two sides of the projector housing; and the outer fan is arranged at one end of the heat dissipation ventilation duct and performs the air draft, so that the heat of the first fin set, the second fin set, the first heat release fin set and the second heat release fin set is discharged out of the projector housing.

Preferably, the outer fan is an axial-flow fan.

Preferably, the inner circulation fan is a turbo-fan, and the number of the inner circulation fan is one or more; and when there are a plurality of inner circulation fans, the plurality of inner circulation fans are arranged in parallel.

Preferably, the first fin set, the second fin set, the first heat release fin set, the second heat release fin set and the heat absorption fin set adopt a straight-rib structure or an undulant structure.

Optionally, the projector also includes a condenser, a first lens, an illumination reflector, a second lens, a field lens, an imaging reflector and a projection lens; the projection light source, the condenser, the first lens, the illumination reflector, the second lens, the LCD light valve, the field lens, the imaging reflector and the projection lens are arranged in sequence in a light traveling direction; the condenser, the first lens, the illumination reflector, the second lens, the field lens and the imaging reflector are installed inside the optical machine shell; and the projection lens is installed at a lens installation port on the other end of the optical machine shell.

The present invention has the beneficial effects: the light source radiator and the optical machine radiator in the present invention both include the PCI plate, and the overall heat transfer speed and bearable heat flow density of the PCI plate are much better than that of the existing heat-tube and straight-rib profile heat dissipation structures, so that the heat dissipation capacity of the light source radiator and the optical machine heat exchanger of the present invention is much better than that of the existing heat dissipation structures; moreover, the problems of the existing heat dissipation structures such as heat resistance, wind resistance, turbulent flow and the like are remarkably or fundamentally improved; a brand new projector with the thermal superconducting material is obtained; and the present invention is high in heat dissipation capacity and high in heat dissipation efficiency.

DESCRIPTION OF THE DRAWINGS

To more clearly describe the technical solutions in the embodiments of the present invention or in the prior art, the drawings required to be used in the description of the embodiments or the prior art will be simply presented below. Obviously, the drawings in the following description are merely some embodiments of the present invention, and for those ordinary skilled in the art, other drawings can also be obtained according to the drawings without contributing creative labor.

DETAILED DESCRIPTION OF PREFERRED EMBODIMENTS

Figure 1:
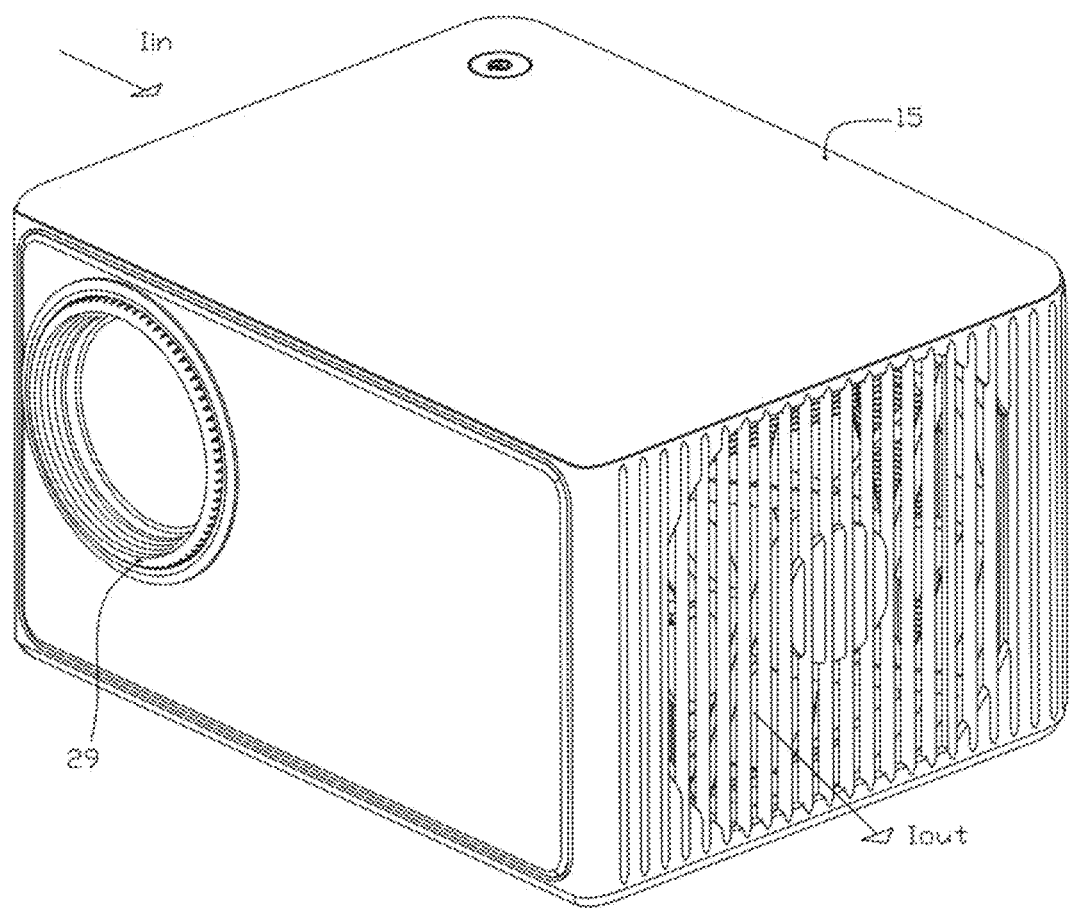
FIG. 1 is a stereoscopic diagram of an external structure of a projector of the present invention.

To better understand the technical solution of the present invention for those skilled in the art, the present invention will be explained below in detail in combination with the drawings. The description in this part is demonstrative and interpretative only and shall not limit the protection scope of the present invention.

It should be noted that similar reference signs and letters indicate similar items in the following drawings. Therefore, a certain item will not be further defined and explained in the subsequent drawings once defined in one drawing.

It should be noted that terms of "center", "upper", "lower", "left", "right", "vertical", "horizontal", "inner" and "outer" indicate direction or position relationships shown based on the drawings or direction or position relationships in which the product of the present invention is usually placed in use, and are only intended to facilitate the description of the present invention and the simplification of the description rather than to indicate or imply that the indicated device or element must have a specific direction or constructed and operated in a specific direction, and therefore, shall not be understood as a limitation to the present invention. In addition, the terms of "first", "second" and "third" are only used for distinguishing the descriptions, rather than being understood to indicate or imply relative importance.

In addition, the terms of "horizontal", "vertical" and "pendant" do not indicate that the component is required to be absolutely horizontal or pendant, but can be slightly tilted. For example, "horizontal" only means that the direction is more horizontal relative to "vertical", and does not mean that the structure must be completely horizontal, but can be slightly tilted.

It should be noted in the explanation of the present invention that, unless otherwise specifically regulated and defined, terms such as "arranged", "installation", "connected", and "connecting" shall be understood in broad sense, and for example, may refer to fixed connection or detachable connection or integral connection, may refer to mechanical connection or electrical connection, and may refer to direct connection or indirect connection through an intermediate medium or inner communication of two elements. For those ordinary skilled in the art, the specific meanings of the above terms in the present invention may be understood according to specific conditions.

Embodiment 1

Referring to FIG. 1-FIG. 9, an embodiment provides a projector with a thermal superconducting material for heat dissipation, which includes a projector housing 15, and an optical machine shell 10, a thermal superconducting material heat dissipation apparatus, an outer fan 13, an inner circulation fan 14, a projection light source 21 and an LCD light valve 26, which are located inside the projector housing 15; and a front surface of the projection light source 21 is installed at a light source installation port on one end of the optical machine shell 10.

The thermal superconducting material heat dissipation apparatus includes a light source radiator 11 and an optical machine heat exchanger 12. The light source radiator 11 includes a first PCI plate 110, a first fin set 111 and a second fin set 112; the first PCI plate 110 is bent to form a U-shaped structure; an inner wall of one end of the U-shaped structure of the first PCI plate 110 is laminated with the first fin set 111; an inner wall of the other end of the U-shaped structure of the first PCI plate 110 is laminated with the second fin set 112; and a back surface of the projection light source 21 is laminated with the middle of the U-shaped structure of the first PCI plate 110. The outer fan 13 is opposite to the light source radiator 11 in positions; and the outer fan 13 performs air draft for the light source radiator 11. In the present embodiment, the outer fan 13 is an axial-flow fan.

Figure 12:
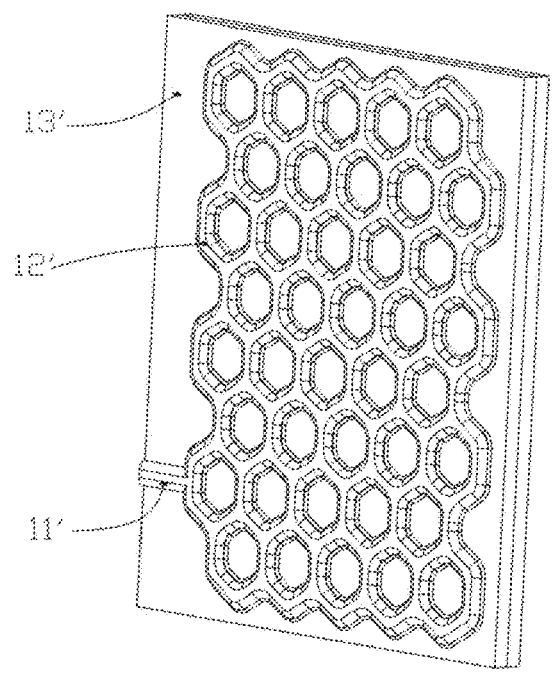
FIG. 12 is a stereoscopic diagram of a PCI plate.
Figure 13:
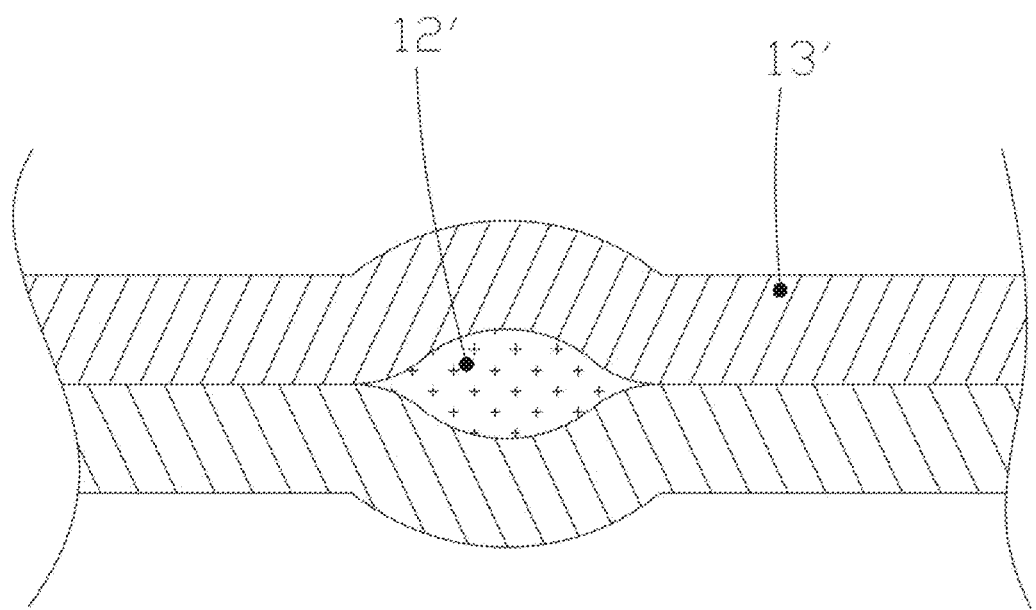
FIG. 13 is a schematic diagram of an internal heat transfer passage of the PCI plate.
Figure 14:
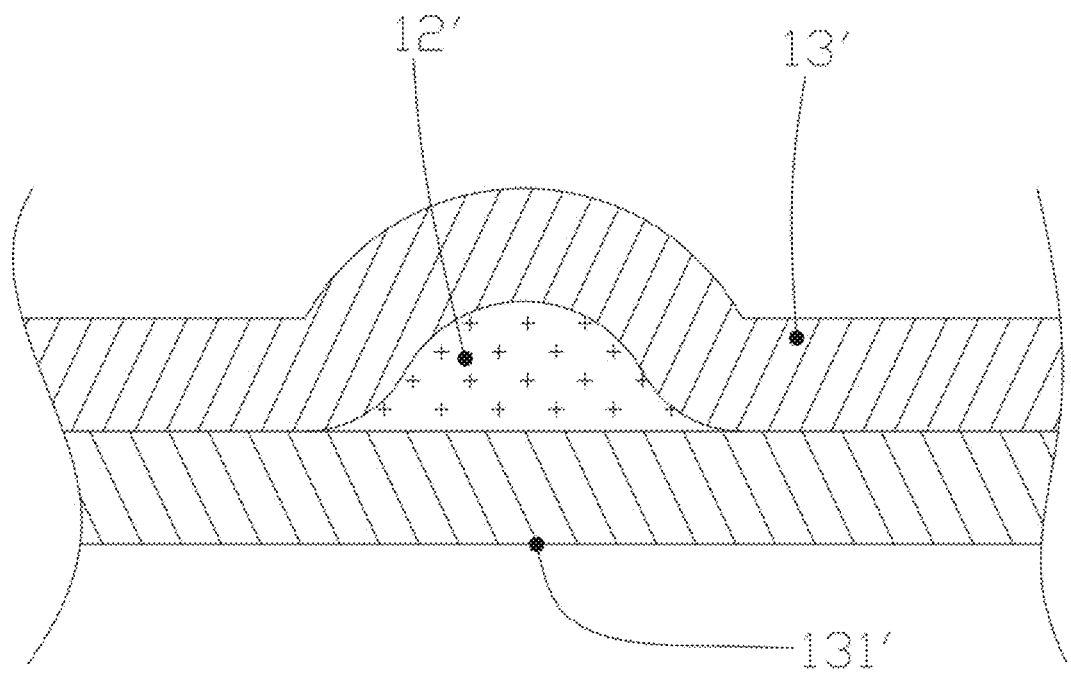
FIG. 14 is a schematic diagram of another internal heat transfer passage of the PCI plate.

In the present embodiment, heat generated by the projection light source 21 is rapidly transferred by a phase change inhibited micro-structure working medium (as shown in FIG. 12-FIG. 14) in an internal heat transfer passage of the first PCI plate 110 to the first fin set 111 and the second fin set 112 for diffusion; and the air draft is performed by the outer fan 13 for the light source radiator 11, so that the heat of the first fin set 111 and the second fin set 112 is rapidly diffused into the atmosphere, thereby realizing the rapid heat dissipation of the projection light source 21.

In the present embodiment, the optical machine heat exchanger 12 includes a first heat release fin set 121, a second heat release fin set 122, a heat absorption fin set 123, a sixth PCI plate 126 and a seventh PCI plate 127; the sixth PCI plate 126 and the seventh PCI plate 127 are arranged in parallel; and the first heat release fin set 121, the heat absorption fin set 123 and the second heat release fin set 122 are successively arranged in parallel, clamped between the sixth PCI plate 126 and the seventh PCI plate 127, and laminated with two opposite inner walls of the sixth PCI plate 126 and seventh PCI plate 127 (the lamination may be specifically realized by re-flow soldering, and is not repeated here).

An inner circulation air duct (as shown by an arrow inside the optical machine shell 10 in FIG. 2 and FIG. 6) is arranged inside the optical machine shell 10; the inner circulation fan 14, the LCD light valve 26 and the heat absorption fin set 123 are arranged in the inner circulation air duct; the heat generated by the LCD light valve 26 is sent by the blowing of the inner circulation fan 14 to the heat absorption fin set 123 through the inner circulation air duct; and the air cooled by the heat absorption fin set 123 is sent back to an air inlet of the inner circulation fan 14 through the inner circulation air duct, thus realizing continuous closed self-circulation. When the optical machine heat exchanger 12 exchanges the heat, the heat in the inner circulation air duct is efficiently and rapidly absorbed by the heat absorption fin set 123, and rapidly transferred by the sixth PCI plate 126 and the seventh PCI plate 127 to the first heat release fin set 121 and the second heat release fin set 122. In the present embodiment, the inner circulation fan 14 is a turbo-fan, and the number of the inner circulation fan is one or more; and when there are a plurality of inner circulation fans 14, the plurality of inner circulation fans 14 are arranged in parallel.

Figure 2:
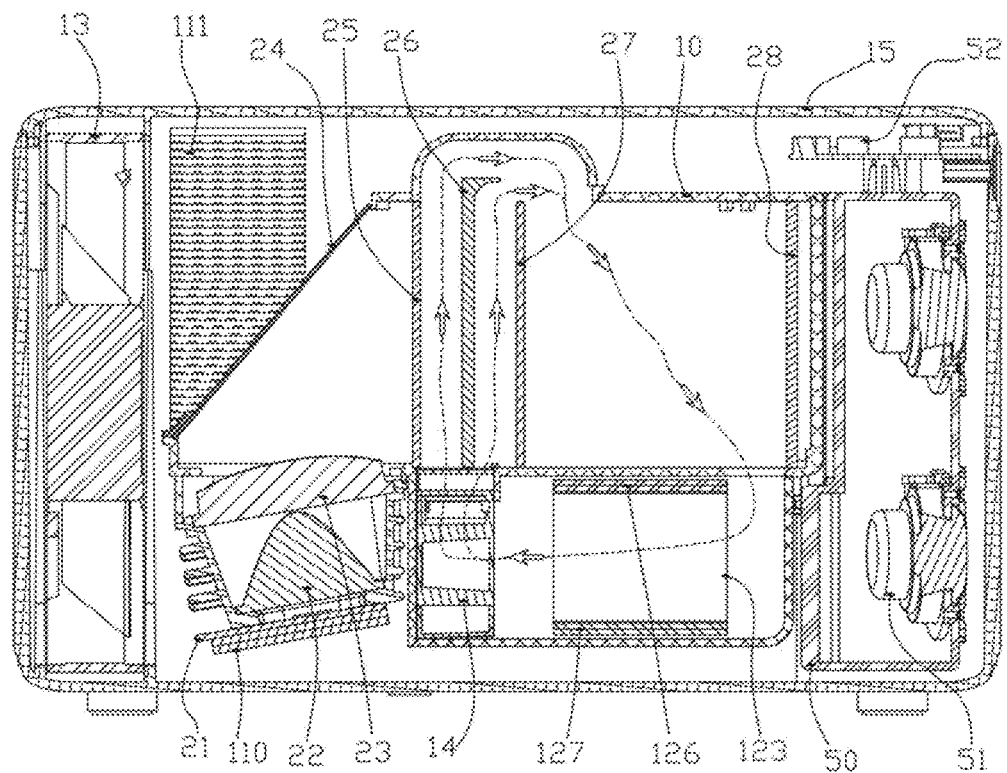
FIG. 2 is a sectional schematic diagram of the projector of the present invention.
Figure 3:
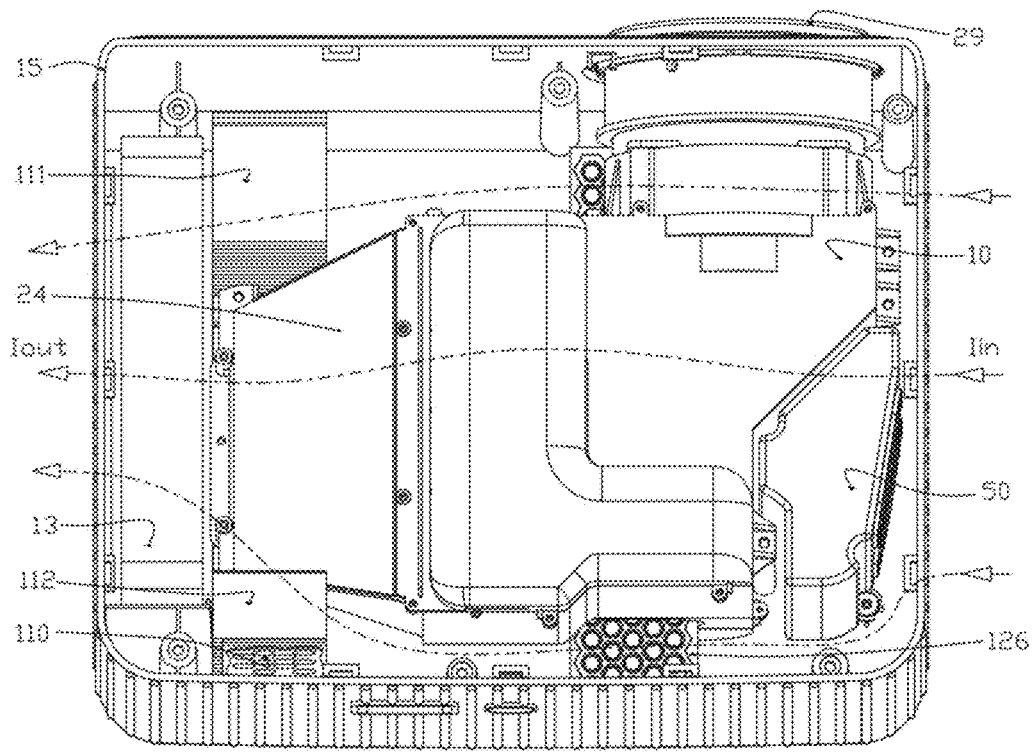
FIG. 3 is a schematic diagram of a projector air duct of the present invention.
Figure 4:
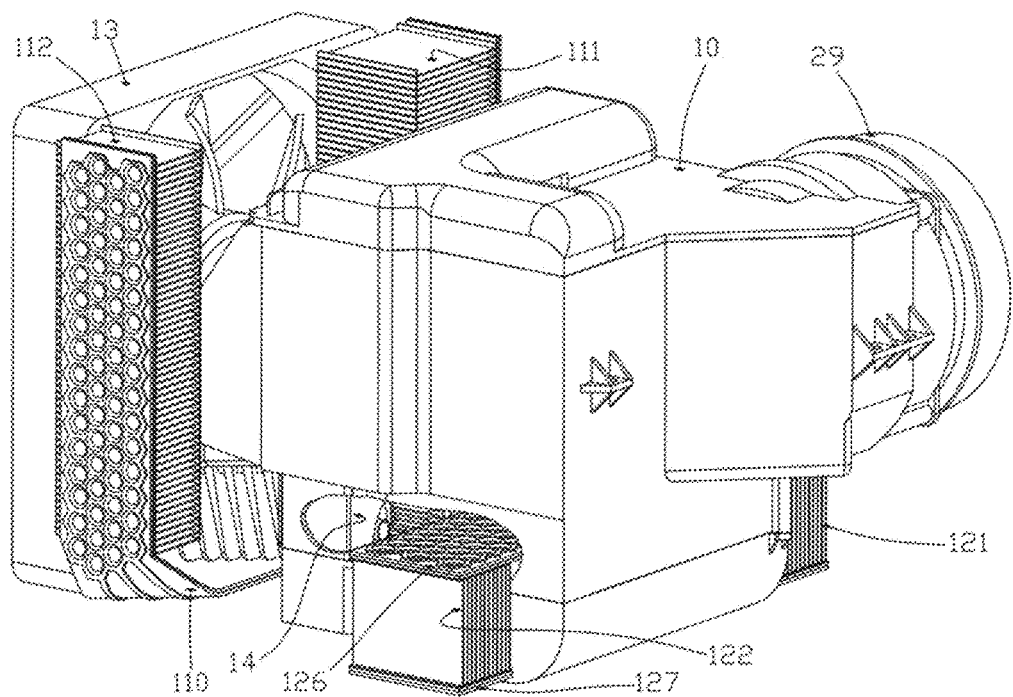
FIG. 4 is a stereoscopic diagram after a projector housing in FIG. 1 is removed.
Figure 5:
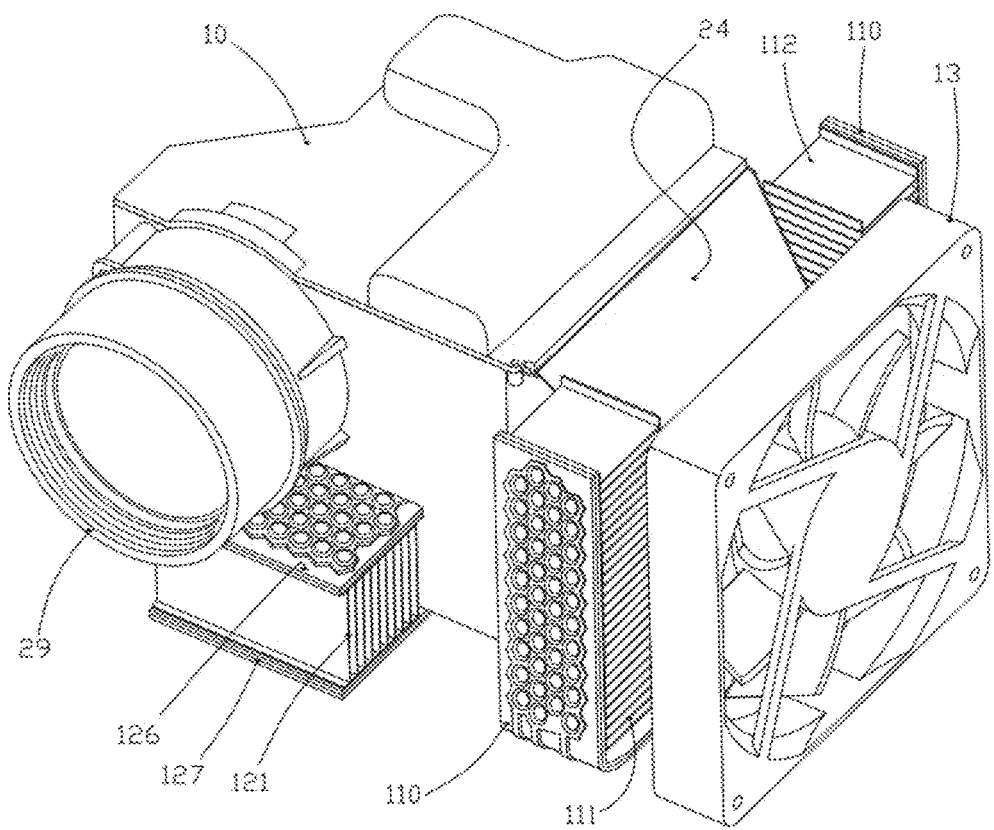
FIG. 5 is a stereoscopic diagram of FIG. 4 from another angle.
Figure 6:
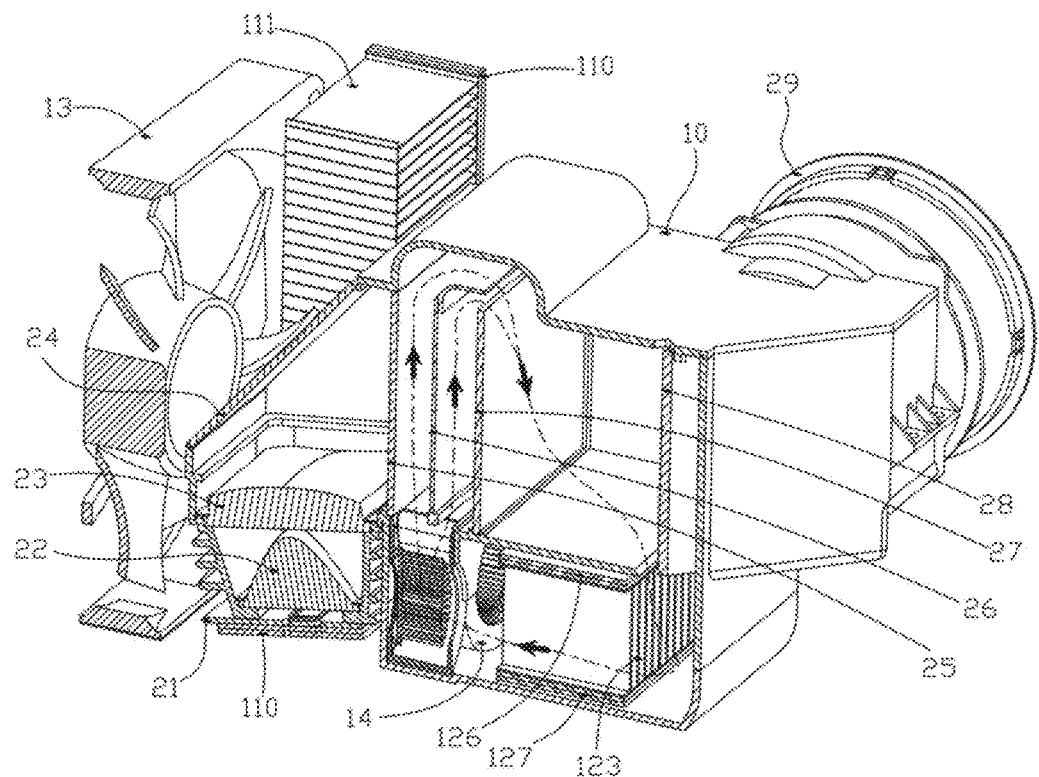
FIG. 6 is a sectional view of FIG. 4.
Figure 7:
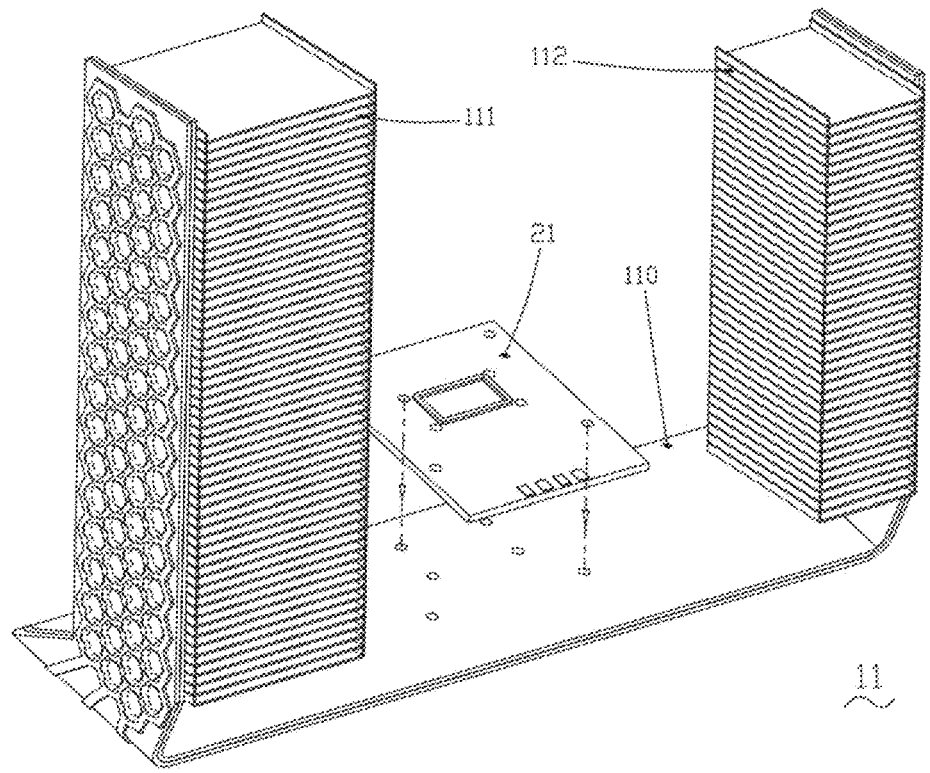
FIG. 7 is a stereoscopic diagram of a light source radiator of the present invention.
Figure 8:
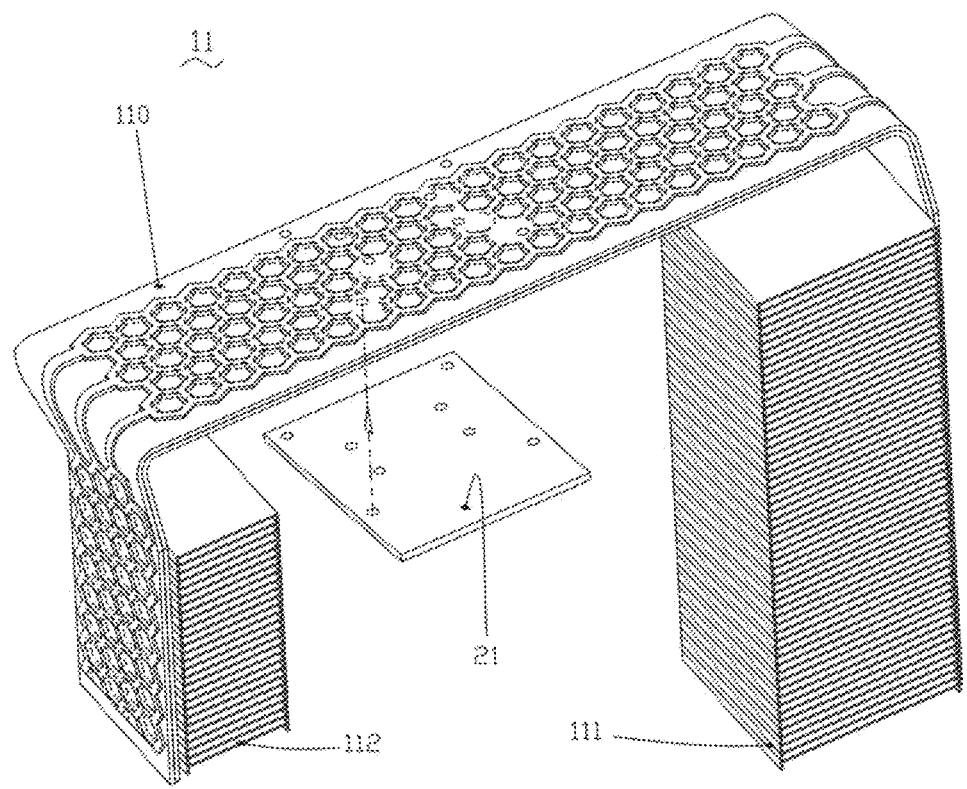
FIG. 8 is a stereoscopic diagram of FIG. 7 from another angle.
Figure 9:
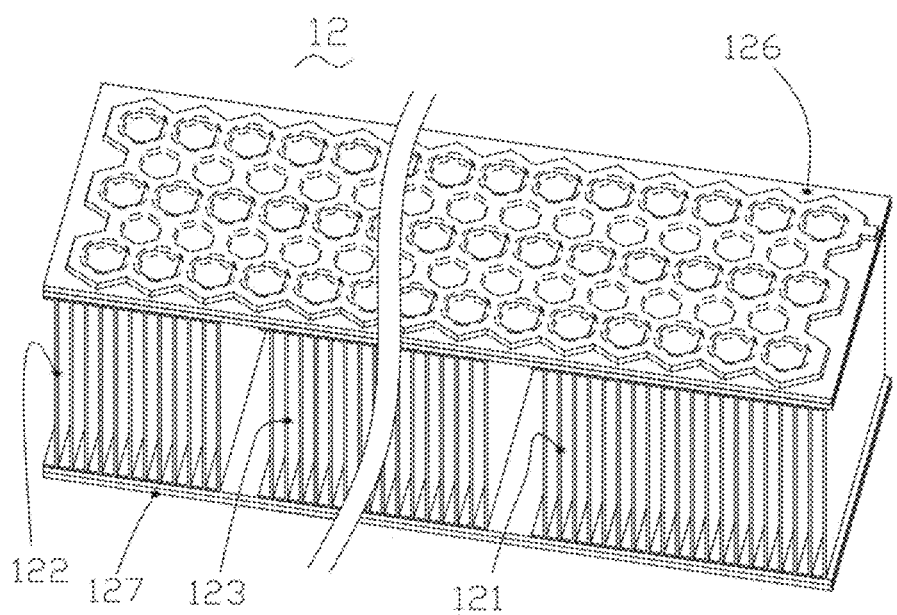
FIG. 9 is a stereoscopic diagram of an optical machine heat exchanger of the present invention.
Figure 10:
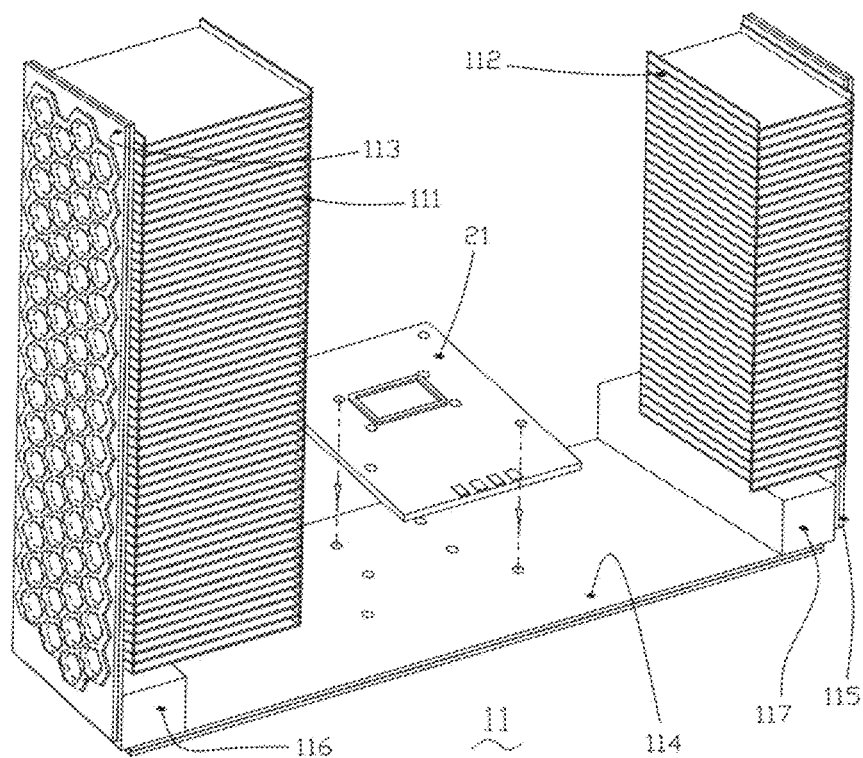
FIG. 10 is a stereoscopic diagram of another embodiment of the light source radiator of the present invention.

Further referring to FIG. 1-FIG. 3, a heat dissipation ventilation duct (as shown by an arrow in FIG. 3) is defined between an inner wall of the projector housing 15 and an outer wall of the optical machine shell 10; the first fin set 111, the second fin set 112, the first heat release fin set 121 and the second heat release fin set 122 are located in the heat dissipation ventilation duct; two ends of the heat dissipation ventilation duct are respectively aligned to vent holes arranged at two sides of the projector housing 15; and the outer fan 13 is arranged at one end of the heat dissipation ventilation duct and performs air draft, so that external cold air (Iin) enters from the vent hole arranged at one side of the projector housing 15, and then the heat of the first fin set 111, the second fin set 112, the first heat release fin set 121 and the second heat release fin set 122 is discharged out of the projector housing 15 (Iout), thereby realizing the rapid heat dissipation of various materials inside the projector housing 15 such as the projection light source 21 and the LCD light valve 26.

In the present embodiment, since the overall heat transfer speed and bearable heat flow density of the PCI plate are much better than that of the existing heat-tube and straight-rib profile heat dissipation structures, the heat dissipation capacity of the light source radiator 11 and the optical machine heat exchanger 12 is much better than that of the light source radiator and optical machine heat exchanger in the prior art, and the heat dissipation efficiency is higher; for the light source radiator 11 and optical machine heat exchanger 12 in the present embodiment, a connection structure between the PCI plate and the heat diffusion fins is simpler, more reasonable and more reliable in contact area and connection ways than the connection between the heat tube and the heat diffusion fins in the prior art, and these technical means plays a positive role in reducing the heat resistance of a heat dissipation system fundamentally; and meanwhile, in the field where the projection light source 21 uses a high-power COB array LED light source, the excellent temperature uniformity of the PCI plate has an effect for greatly improving the heat conduction of an individual LED wafer with ultrahigh local temperature such as "power grabbing", which is conducive to prolonging the service life of the LED light source.

Figure 15:
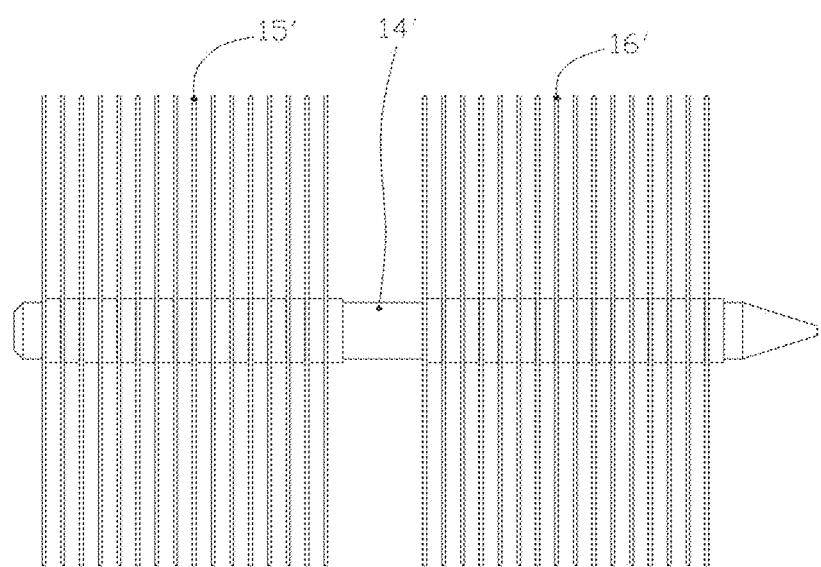
FIG. 15 is a schematic diagram of a heat-tube heat exchanger of an optical machine in the prior art.
Figure 16:
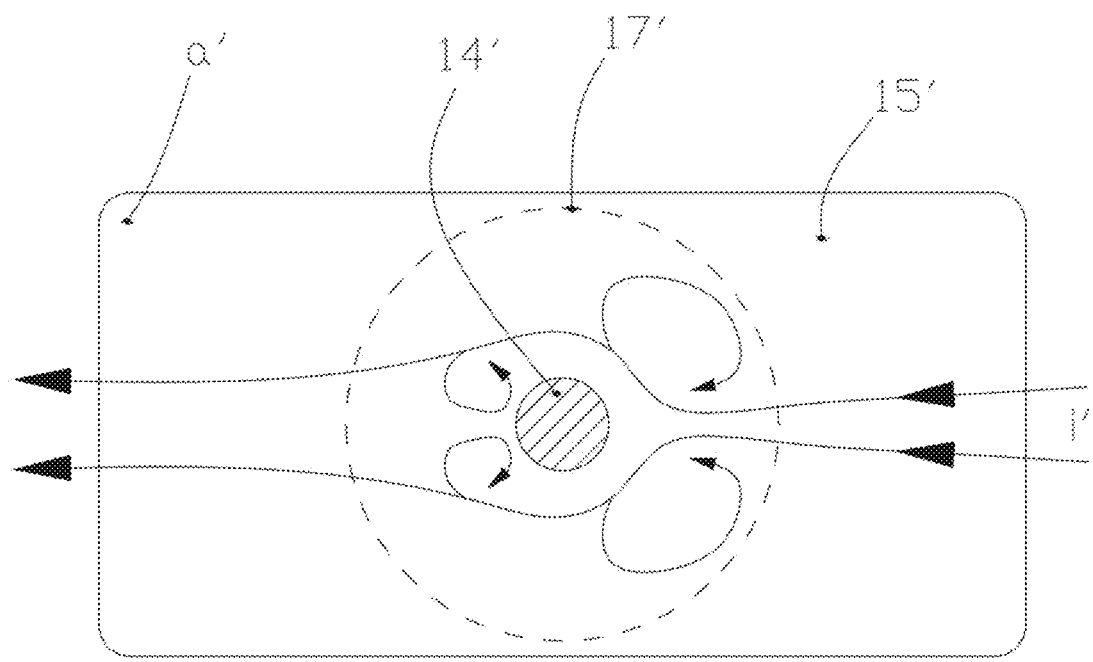
FIG. 16 is a schematic diagram of further illustration of FIG. 15.

Referring to an existing heat-tube heat exchanger (of an optical machine) as shown in FIG. 15 and FIG. 16, 14' indicates a heat tube; 15' indicates a heat absorption component fin; and 16' indicates a heat release component fin, which is generally of a buckled FIN structure. The heat absorption component fin 15' is arranged on an inner circulation air duct of the optical machine, the heat of hot air inside the optical machine is transferred to the heat absorption component fin 15', and then the heat is transferred to the heat tube 14' through the heat absorption component fin 15'; and then the heat is transferred to the heat release component fin 16' through the heat tube 14', so that the heat of the inner circulation air duct of the optical machine is diffused into the atmosphere. In this process, there may be some engineering limitations: there may always be a great temperature difference (for keeping the circulation start of the working medium) between a cold end and a hot end of the heat tube 14', which is generally at least greater than 3° C.-5° C.; the heat is transferred from the heat absorption component fin 15' to the heat release component fin 16', and a heat transfer distance, such as a distance from a point a' to the heat tube 14' in FIG. 15, is always long, which affects the heat transfer efficiency; the closer a dotted line circle 17' that is concentric with the heat tube 14' to the heat tube 14', the greater the heat flow density, and the greater the heat resistance; the heat tube 14' may also generate large wind resistance (referring to vortex (turbulent flow, etc.) generated by air flow i' nearby a windward side and a wind outlet side of the heat tube 14' in FIG. 16; in order to reduce the distance between the point a' and the heat tube 14', the number of the heat tube 14' is necessary to increase, which further increases the wind resistance and the cost; or the size of the heat absorption component fin 15' and the heat release component fin 16' is reduced, which further reduces a heat exchange area, and thus has certain technological incompatibility; and the influence of contact area and contact heat resistance of the heat tube 14' with the heat absorption component fin 15' and the heat release component fin 16' on the performance of the heat-tube heat exchanger is not ignorable. Apparently, referring to the optical machine heat exchanger 12 of the present invention shown in FIG. 9 and FIG. 11, the problems of the existing heat-tube heat exchanger such as heat resistance, wind resistance, turbulent flow and the like are remarkably or fundamentally improved. Similarly, the heat tube radiator adopted by the existing projection light source also has the above problems. The light source radiator 11 of the present invention has already or fundamentally improved the problems of the existing light source radiator.

Figure 17:
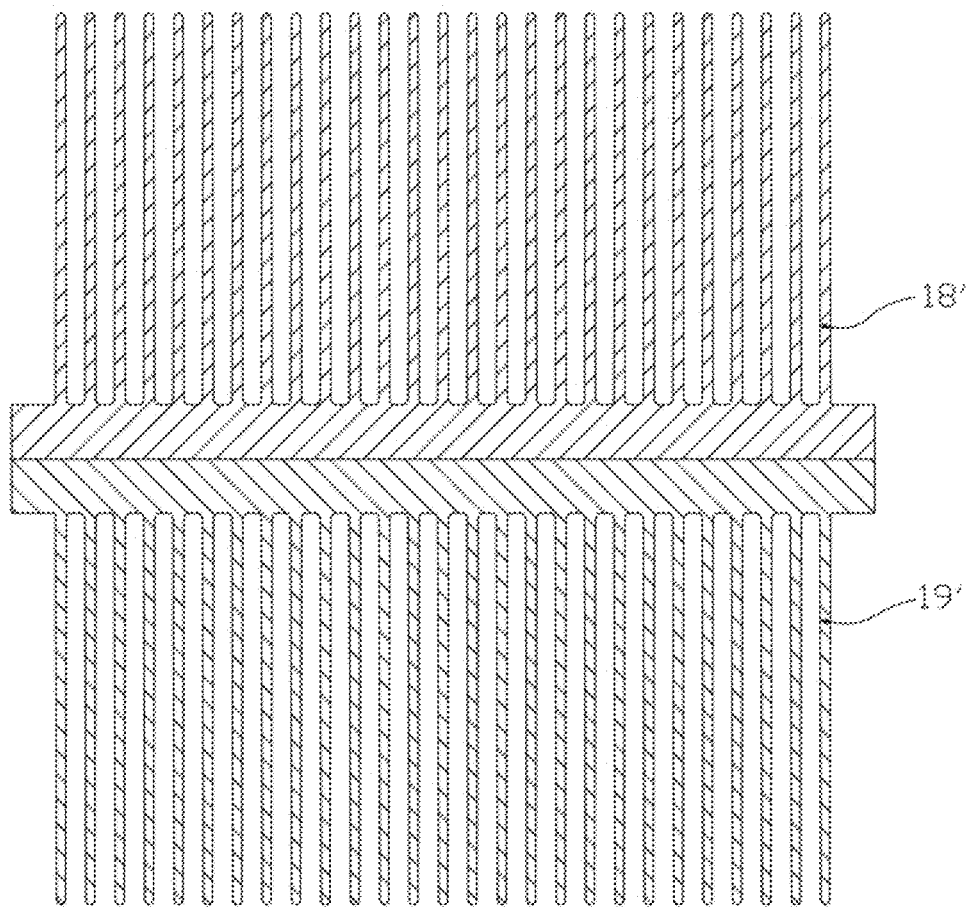
FIG. 17 is a schematic diagram of a straight-rib profile optical machine heat exchanger in the prior art.

FIG. 17 is a schematic diagram of an existing optical machine heat exchanger of a straight-rib profile structure. The existing optical machine heat exchanger of the straight-rib profile structure is generally formed by laminating two straight-rib profile radiators 18' and 19' back to back (or is directly formed by integrally die casting aluminum alloy); and this design is suitable for some products with low brightness output (meaning low heat power), but is gradually eliminated in the industry because of incapability of keeping up with the demand of the user on the brightness (power) of the projector.

In FIG. 2 and FIG. 3, 50 indicates a loudspeaker box, 51 indicates a loudspeaker, and 52 indicates a projector turn-on button, which are standard configuration of the projector at present, and are not repeated here.

Embodiment 2

As shown in FIGS. 1-6 and FIG. 10, the present embodiment differs from embodiment 2 in that the structure of the light source radiator 11 is different. Specifically, the light source radiator 11 includes a first fin set 111, a second fin set 112, a third PCI plate 113, a fourth PCI plate 114, a fifth PCI plate 115, a first switching block 116 and a second switching block 117; and the first switching block 116 and the second switching block 117 are made of metal, preferably but is not limited to materials with high heat conductivity coefficient such as aluminum, aluminum alloy or red copper. At least two adjacent surfaces of each of the first switching block 116 and the second switching block 117 are planes, so as to facilitate the connection between the third PCI plate 113 and the fourth PCI plate 114 and the connection between the fourth PCI plate 114 and the fifth PCI plate 115.

A back surface of the projection light source 21 is laminated to the middle of the fourth PCI plate 114, and the fourth PCI plate 114 is horizontally installed in the projector housing 15; the third PCI plate 113 and the fifth PCI plate 115 are vertically installed in the projector housing 15; two ends of the fourth PCI plate 114 are connected with one plane of each of the first switching block 116 and the second switching block 117 respectively; a lower end of the third PCI plate 113 is connected with another adjacent plane of the first switching block 116, and a lower end of the fifth PCI plate 115 is connected with another adjacent plane of the second switching block 117; and the third PCI plate 113 is laminated with the first fin set 111, and the fifth PCI plate 115 is laminated with the second fin set 112.

As shown in FIG. 2 and FIG. 4-FIG. 8 in embodiment 1, the first PCI plate 110 of the light source radiator 11 needs to be bent into a U shape; and for the current production process of the PCI plate, the forming speed is required to be accurate when the heat transfer passage is bent so as not to damage the micro-structure of the heat transfer passage, so that the product cost of the first PCI plate 110 may be affected to certain extent. In order to solve the above problem, through the above improvement in the present embodiment, the light source radiator 11 is relatively simple to produce; the heat conduction performance depends on raw materials (heat conductivity coefficient) of the first switching block 116 and the second switching block 117 and the corresponding structure design; and the corresponding connection and production process such as soldering or screw locking may be convenient to realize, the principle is also relatively simple, and details are not given here.

Figure 11:
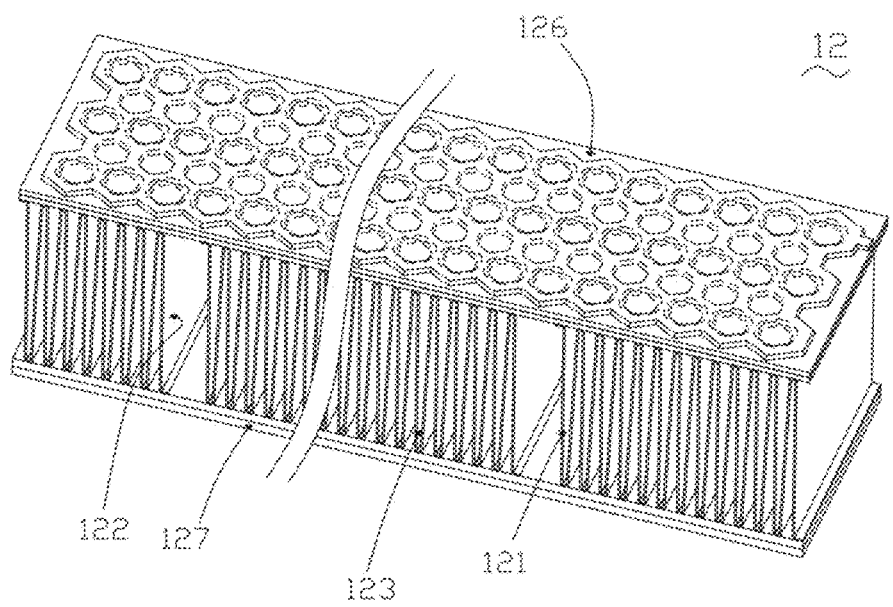
FIG. 11 is a stereoscopic diagram of another embodiment of the optical machine heat exchanger of the present invention.

The first fin set 111 and the second fin set 112 of the light source radiator 11, and the first heat release fin set 121, the second heat release fin set 122 and the heat absorption fin set 123 of the optical machine heat exchanger 12 not only may be produced into the straight-rib structure as shown in FIG. 7-FIG. 10, but also may be produced into an undulant structure as shown in FIG. 11, and then may be laminated with the PCI plate in a braze soldering way.

Compared with the straight-rib fin structure, the undulant fin structure has many advantages in the aspect of fluid mechanics, for example, the wind resistance is lower, the fluid boundary may be destroyed effectively, and the laminar flow effect and other indexes are excellent; the undulant fin structure has remarkable advantages in the aspect of the heat exchange area per unit volume ($m^2/m^3$); and the heat exchange area per unit volume of the straight-rib fin is always less than 1000 $m^2/m^3$, and the heat exchange area per unit volume of the undulant fin is greater than 2000 $m^2/m^3$, and up to 4600 $m^2/m^3$. These characteristics are conducive to improving the performance of the light source radiator 11 and the optical machine heat exchanger 12 when in specific engineering application; and the final choice of the straight-rib fin structure or the undulant fin structure depends on the design requirement of the whole projector.

In the embodiment 1 and embodiment 2, the projector also includes a condenser 22, a first lens 23, an illumination reflector 24, a second lens 25, a field lens 27, an imaging reflector 28 and a projection lens 29; the projection light source 21, the condenser 22, the first lens 23, the illumination reflector 24, the second lens 25, the LCD light valve 26, the field lens 27, the imaging reflector 28 and the projection lens 29 are arranged in sequence in a light traveling direction to form an optical system of the projector, which is a typical optical system of a single-LCD projector with high performance in the market at present, and may refer to FIG. 2 in Chinese patent publication number CN114047664A; and according to the Chinese patent publication number CN113156754A, the illumination reflector 24 is added. The condenser 22, the first lens 23, the illumination reflector 24, the second lens 25, the field lens 27 and the imaging reflector 28 are installed inside the optical machine shell 10; and the projection lens 29 is installed at a lens installation port on the other end of the optical machine shell 10. The above is a basic structure of a fully-sealed optical machine, and is not repeated here.

It should be noted that as shown in FIG. 12-FIG. 14, 11' indicates a filling seal of a heat transfer working medium; 12' indicates a heat transfer passage; and 13' indicates a metal substrate. Generally, the metal substrate 13' is formed by laminating an upper substrate and a lower substrate; the PCI plate with the structure shown in FIG. 13 is common and has the advantage of easy production and low price, but the PCI plate has no plane suitable for installing a heat source and a heat diffusion apparatus; and the heat transfer passage 12' shown in FIG. 14 is different from that in FIG. 13, and the PCI plate may provide a single plane (which is abbreviated as a single-plane PCI plate) 131'. The plane 131' may be conveniently used for installing the heat source and other heat diffusion and heat conduction facilities, and is correspondingly a preferred solution of the first PCI plate 110, the third PCI plate 113, the fourth PCI plate 114, the fifth PCI plate 115, the sixth PCI plate 126 and the seventh PCI plate 127 in the present invention.

Furthermore, a rib height of the first heat release fin set 121, the second heat release fin set 122 and the heat absorption fin set 123 of the optical machine heat exchanger 12 is less than or equal to 15 mm-20 mm; one of the sixth PCI plate 126 and the seventh PCI plate 127 may be omitted so as to reduce the cost; and at the time, the PCI plate may also be bent (such as U-shaped and L-shaped) or treated in other means to adapt to the projector products with different internal stack structures. The above are all technical ways that may be evolved according to the present invention, which will not be repeated here.

The above shows and describes the basic principles, main features and advantages of the present invention. Those skilled in the art shall understand that the present invention is not limited by the above embodiment. The above embodiment and the description merely illustrate the principle of the present invention. Various changes and improvements can also be made to the present invention without departing from the spirit and scope of the present invention, and shall fall into the protection scope of the present invention. The protection scope of the present invention is defined by the appended claims and equivalents.

I claim:

1. A projector with a thermal superconducting material for heat dissipation, comprising a projector housing (15), and an optical machine shell (10), a thermal superconducting material heat dissipation apparatus, an outer fan (13), an inner circulation fan (14), a projection light source (21) and an LCD light valve (26), which are located in the projector housing (15); and a front surface of the projection light source (21) is installed at a light source installation port on one end of the optical machine shell (10);

the thermal superconducting material heat dissipation apparatus comprises a light source radiator (11) and an optical machine heat exchanger (12);

the light source radiator (11) comprises a first PCI plate (110), a first fin set (111) and a second fin set (112); the first PCI plate (110) is bent to form a U-shaped structure; an inner wall of one end of the U-shaped structure of the first PCI plate (110) is laminated with the first fin set (111); an inner wall of the other end of the U-shaped structure of the first PCI plate (110) is laminated with the second fin set (112); and a back surface of the projection light source (21) is laminated with the middle of the U-shaped structure of the first PCI plate (110);

or the light source radiator (11) comprises a first fin set (111), a second fin set (112), a third PCI plate (113), a fourth PCI plate (114), a fifth PCI plate (115), a first switching block (116) and a second switching block (117); the first switching block (116) and the second switching block (117) are made of metal; at least two adjacent surfaces of each of the first switching block (116) and the second switching block (117) are planes; the back surface of the projection light source (21) is laminated to the middle of the fourth PCI plate (114), and the fourth PCI plate (114) is horizontally installed in the projector housing (15); the third PCI plate (113) and the fifth PCI plate (115) are vertically installed in the projector housing (15); two ends of the fourth PCI plate (114) are connected with the planes of the first switching block (116) and the second switching block (117) respectively; a lower end of the third PCI plate (113) is connected with the plane of the first switching block (116); a lower end of the fifth PCI plate (115) is connected with the plane of the second switching block (117); and the third PCI plate (113) is laminated with the first fin set (111), and the fifth PCI plate (115) is laminated with the second fin set (112);

the outer fan (13) corresponds to the light source radiator (11); and the outer fan (13) performs air draft for the light source radiator (11);

the optical machine heat exchanger (12) comprises a first heat release fin set (121), a second heat release fin set (122), a heat absorption fin set (123), a sixth PCI plate (126) and a seventh PCI plate (127); the sixth PCI plate (126) and the seventh PCI plate (127) are arranged in parallel; and the first heat release fin set (121), the heat absorption fin set (123) and the second heat release fin set (122) are successively arranged in parallel, and clamped between the sixth PCI plate (126) and the seventh PCI plate (127), and laminated with two opposite inner walls of the sixth PCI plate (126) and the seventh PCI plate (127);

an inner circulation air duct is arranged inside the optical machine shell (10); the inner circulation fan (14), the LCD light valve (26) and the heat absorption fin set (123) are arranged in the inner circulation air duct; heat generated by the LCD light valve (26) is sent by the blowing of the inner circulation fan (14) to the heat absorption fin set (123) through the inner circulation air duct; and the air cooled by the heat absorption fin set (123) is sent back to an air inlet of the inner circulation fan (14) through the inner circulation air duct;

a heat dissipation ventilation duct is defined between an inner wall of the projector housing (15) and an outer wall of the optical machine shell (10); the first fin set (111), the second fin set (112), the first heat release fin set (121) and the second heat release fin set (122) are located in the heat dissipation ventilation duct; two ends of the heat dissipation ventilation duct are respectively aligned to vent holes arranged at two sides of the projector housing (15); and the outer fan (13) is arranged at one end of the heat dissipation ventilation duct and performs the air draft, so that the heat of the first fin set (111), the second fin set (112), the first heat release fin set (121) and the second heat release fin set (122) is discharged out of the projector housing (15).

2. The projector with the thermal superconducting material for heat dissipation according to claim 1, wherein the outer fan (13) is an axial-flow fan.

3. The projector with the thermal superconducting material for heat dissipation according to claim 1, wherein the inner circulation fan (14) is a turbo-fan, and the number of the inner circulation fan is one or more; and when there are a plurality of inner circulation fans (14), the plurality of inner circulation fans (14) are arranged in parallel.

4. The projector with the thermal superconducting material for heat dissipation according to claim 1, wherein the first fin set (111) and the second fin set (112) of the light source radiator (11), and the first heat release fin set (121), the second heat release fin set (122) and the heat absorption fin set (123) of the optical machine heat exchanger (12) adopt a straight-rib structure or an undulant structure.

5. The projector with the thermal superconducting material for heat dissipation according to claim 1, wherein the projector further comprises a condenser (22), a first lens (23), an illumination reflector (24), a second lens (25), a field lens (27), an imaging reflector (28) and a projection lens (29); the projection light source (21), the condenser (22), the first lens (23), the illumination reflector (24), the second lens (25), the LCD light valve (26), the field lens (27), the imaging reflector (28) and the projection lens (29) are arranged in sequence in a light traveling direction; the condenser (22), the first lens (23), the illumination reflector (24), the second lens (25), the field lens (27) and the imaging reflector (28) are installed inside the optical machine shell (10); and the projection lens (29) is installed at a lens installation port on the other end of the optical machine shell (10).

* * * * *